K. P. McELROY.
METHOD OF MAKING CARBON BISULFID.
APPLICATION FILED MAY 27, 1919.
1,369,825.
Patented Mar. 1, 1921.
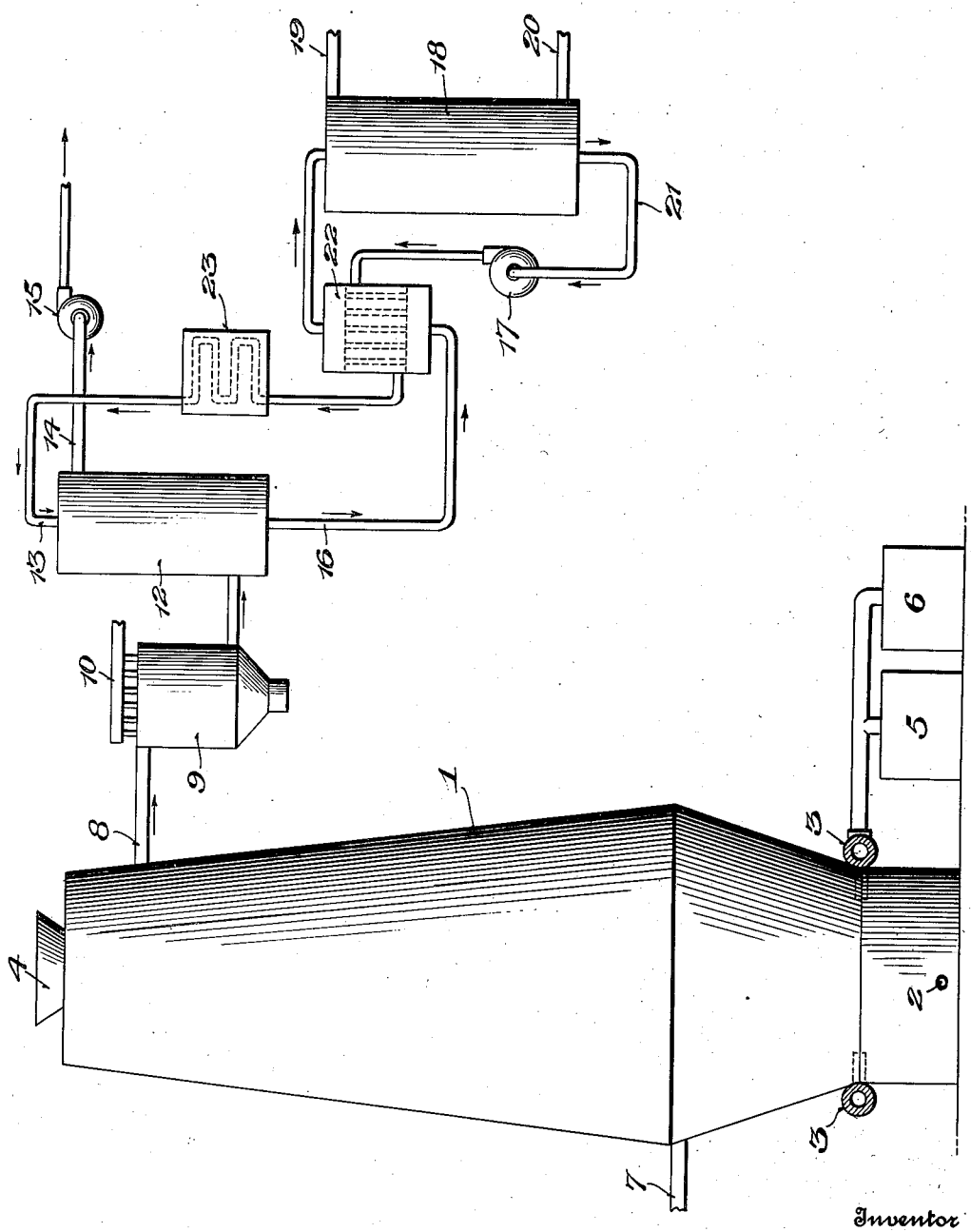

UNITED STATES PATENT OFFICE.

KARL P. McELROY, OF WASHINGTON, DISTRICT OF COLUMBIA.

METHOD OF MAKING CARBON BISULFID.

1,369,825.    Specification of Letters Patent.    Patented Mar. 1, 1921.

Application filed May 27, 1919. Serial No. 300,044.

*To all whom it may concern:*

Be it known that I, KARL P. McELROY, a citizen of the United States, residing at Washington, in the District of Columbia, have invented certain new and useful Improvements in Methods of Making Carbon Bisulfid, of which the following is a specification.

This invention relates to methods of making carbon bisulfid; and it comprises a process of producing carbon bisulfid wherein sulfur, or sulfur containing gases, are led into contact with a mass of carbon maintained at a high temperature by means of a hot air blast, the resultant mixture of producer gas and vapors of carbon bisulfid being cooled and scrubbed with oil to abstract the bisulfid, the charged oil being then distilled to recover the bisulfid, recooled and once more used to absorb carbon bisulfid; all as more fully hereinafter set forth and as claimed.

As is well known sulfur in contact with incandescent carbon reacts with it with absorption of heat, yielding vapors of carbon bisulfid. The bisulfid was formerly produced in retorts but because of the great heat absorption rendering heating difficult this method is now very little used and most bisulfid is made in furnaces having internal electrical heating means. This however is expensive because of the cost of power and there are some other objections.

It is the object of the present invention to utilize a gas producer for furnishing the heat required for the manufacture of carbon bisulfid, a deep bed of fuel (charcoal, anthracite, coke, etc.) being raised to a high temperature by an air blast and sulfur brought into contact with the glowing carbon. Introduction of sulfur may be simultaneous with the introduction of air, or alternated therewith. For a number of reasons however I regard simultaneous supply of air and sulfur as being better. Any combustion of the sulfur that may occur is immaterial, the $SO_2$ being at once reduced by the carbon. It is even possible to use smelter gases and roaster gases containing $SO_2$ in lieu of sulfur. Such gases usually contain enough air to keep the fuel bed alive. Whatever the composition of the blast fed the producer I regard it as important that it should be as hot as possible; and I also regard it as desirable that the hot blast be led into contact with the carbon at a sufficient distance from the point of sulfur introduction to allow normal development of gas producer reactions prior to the formation of the bisulfid.

Carbon bisulfid being a very volatile liquid with a high vapor tension at all ordinary temperatures, including those of most waters available for cooling, recovery of the bisulfid from the mixture of gases and vapors leaving the furnace is difficult by any simple condensing means. For this reason I use a scrubbing oil for removing the bisulfid from the gas, the charged oil being then heated in a still to strip it of absorbed $CS_2$, cooled and returned for use anew. Any ordinary fatty oil may be used; but high boiling petroleum oils, such as lubricating oil, are generally more satisfactory. After removal of the $CS_2$ the remaining gas may be used for heating purposes. Some portion of it may be used for producing the heat necessary for distillation, and some is advantageously used for heating the air blast of the producer.

As a rule gas producers are run at as low a temperature as possible to avoid slagging and clinkering difficulties with the ash; it being usual to introduce an endothermic (steam or products of combustion) to prevent any local development of high temperature. In this invention it is found desirable to go to the other extreme and maintain a localized zone of extreme temperature at the base of the producer with the aid of a hot blast; this temperature being sufficient to form and fuse slag, lime or other fluxes being introduced with the fuel to slag its ash. The sulfur acts as an endothermic, but I introduce it at points above the high temperature zone.

The production of carbon bisulfid is proportionate to the amount of available heat and I therefore desire to have the gases go forward to the zone where sulfur and carbon meet at as high a temperature as possible. The formation of bisulfid absorbs so much heat that at this point there is a sharp decline in temperature, giving only a comparatively narrow reaction zone. Above this level, the descending carbon acts to absorb the heat of the ascending gases and vapors, being itself preheated.

In the accompanying illustration I have shown, more or less diagrammatically certain organizations of apparatus elements within the present invention and capable of employment in the described process. In this showing the figure is in elevation, certain parts being in section.

Element 1 is a gas producer having the general form of a low blast furnace and built of fire brick or other suitable material. It is provided with slag notch 2, blast twyers 3 and charging device 4. For heating the blast a pair of diagrammatically shown stove checkers 5 and 6 are provided, waste gas being burnt in these in a well understood way. Entering the boshes is inlet 7 for sulfur vapors or for $SO_2$ coming from a sulfur vaporizer or burner. Waste gases from smelters or roasters may be used. Near the top of the column is outlet 8 for gases and vapors. This leads to collecting chamber 9, cooled by depending water pipes 10, wherein water vapor, sulfur vapor, etc., are condensed and collected. Ordinarily not much $CS_2$ is here condensed; but such as may form is collected. The cooled gases and vapors pass through 11 to scrubbing tower 12 where the $CS_2$ is removed by chilled oil entering through 13. This tower may be of any of the ordinary types used for scrubbing, being packed with broken coke, pottery rings, etc., or being provided with shelves. The internal construction is not material as long as a good scrubbing effect is secured. The scrubbed gases are removed at 14, suction fan 15 being used to facilitate their movement. Oil charged with $CS_2$ leaves the tower through 16 and is delivered to the top of a stripping tower 18 where the carbon bisulfid is distilled off, its vapors passing to a suitable condenser (not shown) through conduit 19. This tower may be heated in any suitable way. As shown, it is provided with a steam inlet 20. The hot oil leaves the base of the tower through 21, passes in countercurrent to incoming oil through heat exchanger 22 and thence through cooler 23 back to the first scrubbing tower. Pump 17 is used to produce flow.

In the use of the structure shown, carbon of any kind is fed in through hopper 4. Anthracite, coke or charcoal may be used, but bituminous coal in inadvisable since the products of distillation contaminate the bisulfid. With the fuel should be fed enough limestone or other flux to slag the ash. Some preformed slag is often a useful addition with fuel poor in ash. Fan 15 is run at such a speed as to cause a slight suction at the hopper to prevent outward leakage of gases carrying $CS_2$. Passing downward through shaft 1, the fuel is preheated and dried by the ascending gases and vapors which should be withdrawn at 8 at a temperature a little above 100° C. Drying is important since any $H_2O$ reaching the reaction zone causes a loss of sulfur as $H_2S$. With an exit temperature of 105–110° C., drying is good and very little sulfur gets by.

Passing downward the dried and preheated fuel reaches the reaction zone around sulfur inlet 7 where $CS_2$ is formed at the expense of the heat of the hot gases coming from below, these gases being cooled by the heat absorption and passing upward in admixture with the $CS_2$ vapors. Any sulfur vapor also going up is condensed in the fuel and returned. Such portion of the carbon as is not consumed in forming $CS_2$ passes downward into the hot zone where it is gasified by hot air from 3, ash constituents being slagged and withdrawn at 2.

The gases and vapors leaving the furnace at 8 are cooled in 9 by cooling pipes 10. This takes out most of the moisture coming from the fuel, any sulfur vapors which may pass by and a little $CS_2$, the amount of the last depending upon the ratio of its vapors to the gas present. Ordinarily not much is here condensed. The cooled gases and vapors pass into 12, where the $CS_2$ is scrubbed out by cold oil and the gas removed to a point of use by fan 15. The oil charged with $CS_2$ goes through heat-interchanger 22 wherein it is somewhat warmed and is then sprayed into the stripping tower 18 where the $CS_2$ is removed. The hot stripped oil leaves through 21, passes through interchanger 22 and is chilled in 23. It then goes back for further use.

Some sulfureted hydrogen may be contained in the gas leaving the absorption tower by 14; and particularly if the fuel is not well dried, or contains hydrocarbons, or if much moisture is introduced by the blast. In this event the gas may be passed through the ordinary oxid purifiers to abstract the sulfur; this sulfur being afterward returned to the system.

Where the introduction of sulfur and of air are alternated, chamber 9 may collect much or most of the bisulfid produced; but scrubbing of outgoing gas is always necessary.

What I claim is:—

1. The process of producing carbon bisulfid which comprises passing fuel downward through a shaft under gas producer conditions, introducing air at its base, introducing sulfur into the shaft, removing the gases and vapors and scrubbing the mixture with oil to collect the carbon bisulfid.

2. The process of producing carbon bisulfid which comprises blasting a descending column of fuel with hot air at its base, introducing sulfur into the column at a higher point, removing the mixture of producer gas and carbon bisulfid vapors at a still higher point and scrubbing the mixture with oil to collect the carbon bisulfid.

3. The process of producing $CS_2$ which comprises blowing air into the base of a column of descending fuel while maintaining the temperature of combustion in such base high enough to slag fuel ash, introducing sulfur above the combustion zone, withdrawing gas at a still higher point, and removing $CS_2$ from the gaseous products.

In testimony whereof, I affix my signature hereto.

K. P. McELROY.